United States Patent
Busaba et al.

(10) Patent No.: US 8,938,605 B2
(45) Date of Patent: Jan. 20, 2015

(54) INSTRUCTION CRACKING BASED ON MACHINE STATE

(75) Inventors: Fadi Busaba, Poughkeepsie, NY (US);
Bruce Giamei, Poughkeepsie, NY (US);
David Hutton, Tallahassee, FL (US);
Eric Schwarz, Gardiner, NY (US)

(73) Assignee: International Business Machines Corporation, Armonk, NY (US)

( * ) Notice: Subject to any disclaimer, the term of this patent is extended or adjusted under 35 U.S.C. 154(b) by 1105 days.

(21) Appl. No.: 12/718,685

(22) Filed: Mar. 5, 2010

(65) Prior Publication Data

US 2011/0219213 A1 Sep. 8, 2011

(51) Int. Cl.
*G06F 9/30* (2006.01)
*G06F 9/34* (2006.01)

(52) U.S. Cl.
CPC .......... *G06F 9/342* (2013.01); *G06F 9/30174* (2013.01); *G06F 9/3017* (2013.01); *G06F 9/30181* (2013.01); *G06F 9/30189* (2013.01)
USPC ......................................................... 712/209

(58) Field of Classification Search
CPC .................................................. G06F 9/3017
See application file for complete search history.

(56) References Cited

U.S. PATENT DOCUMENTS

| | | | |
|---|---|---|---|
| 4,604,684 A | 8/1986 | Epstein | |
| 4,652,991 A | 3/1987 | Yamano | |
| 4,853,840 A | 8/1989 | Shibuya | |
| 4,858,104 A | 8/1989 | Matsuo et al. | |
| 4,873,629 A | 10/1989 | Harris et al. | |
| 5,073,855 A | 12/1991 | Staplin et al. | |
| 5,097,407 A * | 3/1992 | Hino et al. | ..................... 712/209 |
| 5,150,468 A | 9/1992 | Staplin et al. | |
| 5,297,266 A | 3/1994 | Tanaka | |
| 5,434,985 A | 7/1995 | Emma et al. | |
| 5,467,473 A | 11/1995 | Kahle et al. | |
| 5,488,707 A | 1/1996 | Phillips et al. | |
| 5,500,947 A | 3/1996 | Uhler et al. | |
| 5,664,215 A | 9/1997 | Burgess et al. | |
| 5,666,506 A | 9/1997 | Hesson et al. | |
| 5,694,565 A | 12/1997 | Kahle et al. | |
| 5,717,910 A | 2/1998 | Henry | |
| 5,721,855 A | 2/1998 | Hinton et al. | |

(Continued)

FOREIGN PATENT DOCUMENTS

| EP | 378816 | 12/1989 |
|---|---|---|
| EP | 0 374 526 A2 | 6/1990 |

(Continued)

OTHER PUBLICATIONS

Michael J, Flynn. Instruction Sets and Their Implementations. IEEE . . . EE Department, CSL. Stanford, CA. Dec. 27-29, 1990.

(Continued)

*Primary Examiner* — Andrew Caldwell
*Assistant Examiner* — John Lindlof
(74) *Attorney, Agent, or Firm* — Fleit Gibbons Gutman Bongini & Bianco; Thomas Grzesik

(57) ABSTRACT

A method, information processing system, and computer program product manage instruction execution based on machine state. At least one instruction is received. The at least one instruction is decoded. A current machine state is determined in response to the decoding. The at least one instruction is organized into a set of unit of operations based on the current machine state that has been determined. The set of unit of operations is executed.

19 Claims, 4 Drawing Sheets

(56) References Cited

U.S. PATENT DOCUMENTS

| | | | |
|---|---|---|---|
| 5,742,805 | A | 4/1998 | Kulkarni et al. |
| 5,752,273 | A | 5/1998 | Nemirovsky et al. |
| 5,781,752 | A | 7/1998 | Moshovos et al. |
| 5,802,359 | A | 9/1998 | Webb et al. |
| 5,826,089 | A | 10/1998 | Ireton |
| 5,867,684 | A | 2/1999 | Kahle et al. |
| 5,909,567 | A | 6/1999 | Novak et al. |
| 5,918,031 | A * | 6/1999 | Morrison et al. ............ 712/208 |
| 6,058,470 | A | 5/2000 | Webb et al. |
| 6,092,185 | A | 7/2000 | Slegel et al. |
| 6,134,646 | A | 10/2000 | Feiste et al. |
| 6,219,742 | B1 | 4/2001 | Stanley |
| 6,336,183 | B1 | 1/2002 | Le et al. |
| 6,654,869 | B1 | 11/2003 | Kahle et al. |
| 6,697,939 | B1 | 2/2004 | Kahle |
| 6,999,952 | B1 | 2/2006 | Pham |
| 7,082,517 | B2 | 7/2006 | Busaba et al. |
| 7,085,917 | B2 | 8/2006 | Busaba et al. |
| 7,159,102 | B2 | 1/2007 | Irie et al. |
| 7,162,621 | B2 | 1/2007 | Kissell |
| 7,269,715 | B2 | 9/2007 | Le et al. |
| 2002/0152259 | A1 | 10/2002 | Trong et al. |
| 2005/0223292 | A1 | 10/2005 | Lee et al. |
| 2006/0053343 | A1 | 3/2006 | Hayem |
| 2007/0204138 | A1 * | 8/2007 | Savransky et al. ............ 712/217 |
| 2007/0288725 | A1 | 12/2007 | Luick |
| 2009/0210659 | A1 | 8/2009 | Carlough et al. |
| 2009/0240914 | A1 | 9/2009 | Malley et al. |
| 2009/0240919 | A1 | 9/2009 | Alexander et al. |
| 2010/0250802 | A1 | 9/2010 | Waugh et al. |

FOREIGN PATENT DOCUMENTS

| | | |
|---|---|---|
| EP | 374830 A3 | 3/1992 |
| EP | 0 514 092 A2 | 11/1992 |
| JP | 02183830 | 7/1990 |
| JP | 04333141 | 11/1992 |
| JP | 0713758 | 1/1995 |
| JP | 07129399 | 5/1995 |
| JP | 2000259408 A | 9/2000 |
| JP | 2001229024 A2 | 8/2001 |
| JP | 2004342102 A2 | 12/2004 |

OTHER PUBLICATIONS

Michael Gschwind and Kemal Ebcioglu and Erik Altman and Sumedh Sathaye. Binary Translation and Architecture Convergence Issues for IBM System/390. In Preceedings of ICS-2000 Sante Fe, New Mexico, Aug. 8-10, 2000.

Abraham Ziv and Merav Aharoni and Sigal Asaf. Solving Range Constraints for Binary Floating Instructions. Haifa University. 2003. International Business Machines Research Labs. Haifa, Israel.

Fadi Busaba and Timothy Slegel and Steven Carlough and Christopher Krygowski and John G. Rell. The Design of the Fixed Point Unit for z990 Microprocessor. GLSVLSI' 04. 2004. Boston.

Gideon D, Intrater and Ilan Y. Spikkinger. Performance Evaluation of a Decoded Instruction Cache for Variable Instruction Length Computers. IEEE. Oct. 2004.

Gang Quan and James P. Davis and Siddhaveerasharan Devarkal and Duncan A . Buell. High Level Synthesis for Large Bit Width Multipliers on FPGAS: A Case Study. Codes+ISSS' 05. 2005. New Jersey.

Jose Rizo Morente and Miguel Casas-Sanchez and C.J. Bleakley. Dynamic Current Modeling at the Instruction Level. ISLPED' 06. 2006. Tegemsee, Germany.

International Search Report and Written Opinion based on application No. PCT/EP2010/067055 dated Dec. 6, 2010.

Non-Final Office Action dated Dec. 21, 2012 received for U.S. Appl. No. 12/695,687.

Non-Final Office Action dated Nov. 21, 2012 received for U.S. Appl. No. 12/774,299.

Angiulli et al., "Exclusive OR Performance Enhancement", IBM TDB, Sep. 1, 1981, pp. 1852-1854.

Ngai et al., "Fast Destructive Overlap Move Instruction Execution Algorithm", IBM TDB, Dec. 1, 1982, pp. 3569-3576.

Ngai et al.,"Destructive Overlap Detection Hardware", IBM TDB, Jun. 1, 1976, pp. 61-64.

Final Office Action dated Mar. 14, 2013 received for U.S. Appl. No. 12/774,299.

Gwennap, Linley "Intel's P6 Uses Decoupled Superscalar Design", Feb. 16, 1995, Microprocessor Report, vol. 9, No. 2, pp. 1-7.

Final Office Action dated Aug. 19, 2013 for U.S. Appl. No. 12/695,687.

Final Office Action dated Jan. 14, 2014 for U.S. Appl. No. 12/695,687.

Tendler, J, M., et al., "POWER4 system microarchitecture," Jan. 2002, pp. 5-25, IBM Research and Development vol. 46, No. 1. Copyright 2002 IBM, 0018-8646/02.

International Search Report & Written Opinion dated Sep. 7, 2011 received for PCT/EP2011/056429.

IBM, "z/Architecture Principles of Operation", Eighth Edition, Feb. 2009, pp. 3-36, 4-3 thru 4-12, available at http://publibfp.dhe.ibm.com/epubs/pdf/dz9zr007.pdf.

* cited by examiner

BAS/BASR in 24/31 bit address mode

302 — U1 : Branch Uop. This is not a branch i R2=0 for BASR.
        branch target ← GPR-R2 for BASR
        branch target ← GPR-B2 + GPR-X2 + D2 for BAS
304 — U2 : scratch GPR1 ← IA + ILC
306 — U3 : GPR-R1     ← scratch GPR1 (add link info, PSW(32))

FIG. 3

BAS/BASR in 64 bit address mode (saving of 1 Uop compared to 24/31 bit mode).

U1 : Branch Uop. This is not a branch i R2=0 for BASR.
        branch target ← GPR-R2 for BASR
        branch target ← GPR-B2 + GPR-X2 + D2 for BAS
U2 : GPR1 ← IA + ILC

FIG. 4

BAL/BALR in 24 bit mode

U1 : Branch Uop. This is not a branch i R2=0 for BALR.
        branch target ← GPR-R2 for BALR
        branch target ← GPR-B2 + GPR-X2 + D2 for BAL
U2 : scratch GPR1 ← IA + ILC
U3 : GPR-R1     ← scratch GPR1 (add link info)
               ← reads condition code, Instruction length code, program mask (PSW(20:23))

FIG. 5

BAL BAL/BALR in 31 bit mode

U1 : Branch Uop. This is not a branch i R2=0 for BALR.
        branch target ← GPR-R2 for BALR
        branch target ← GPR-B2 + GPR-X2 + D2 for BAL
U2 : scratch GPR1 ← IA + ILC
U3 : GPR-R1     ← scratch GPR1 (add link info, PSW(31))

FIG. 6

INSTRUCTION CRACKING BASED ON MACHINE STATE

FIELD OF THE INVENTION

The present invention generally relates to microprocessors, and more particularly relates to organizing instructions into simpler operations

BACKGROUND OF THE INVENTION

Various conventional approaches for increasing IPC (Instruction per cycle) crack instructions into a simpler set of unit of operations (Uops). However, although these approaches crack the instructions into Uops, the cracking is generally static, based on instruction opcodes, and not directed towards efficient use of the hardware, in particular the issue queues. Therefore, the issues queues can suffer in performance and issue bandwidth.

SUMMARY OF THE INVENTION

In one embodiment, a method for managing instruction execution based on machine state is disclosed. The method comprises receiving at least one instruction. The at least one instruction is decoded. A current machine state is determined in response to the decoding. The at least one instruction is organized into a set of unit of operations based on the current machine state that has been determined. The set of unit of operations is executed.

In another embodiment, an information processing system for managing instruction execution based on machine state is disclosed. The information processing system comprises a memory and a processor communicatively coupled to the memory. An instruction decode unit is configured to receive at least one instruction. The instruction decode unit is also configured to decode the at least one instruction. A machine state determining unit is configured to determine a current machine state in response to the decoding. An instruction cracking unit within the processor is configured to organize the at least one instruction into a set of unit of operations based on the current machine state that has been determined. The processor is configured to execute the set of unit of operations.

In yet another embodiment, a computer program product for managing instruction execution based on machine state is disclosed. The computer program product comprises a storage medium readable by a processing circuit and storing instructions for execution by the processing circuit for performing a method. The method comprises receiving at least one instruction. The at least one instruction is decoded. A current machine state is determined in response to the decoding. The at least one instruction is organized into a set of unit of operations based on the current machine state that has been determined. The set of unit of operations is executed.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIGS. 3-6 show various examples of cracking instructions based on machine state.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. Plural and singular terms are the same unless expressly stated otherwise.

Operating Environment

Figure 1:
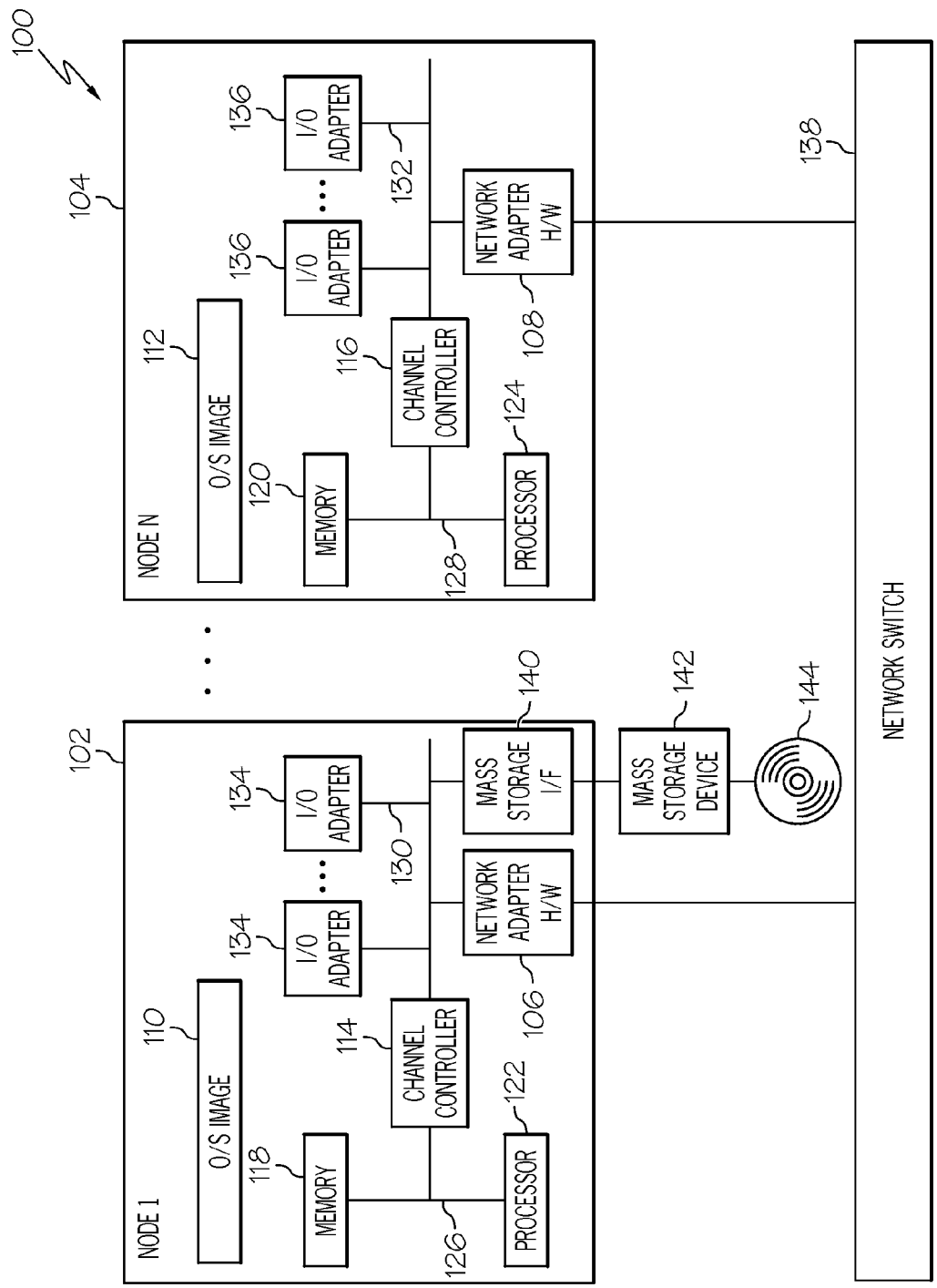
FIG. 1 illustrates one example of an operating environment according to one embodiment of the present invention.

FIG. 1 shows an exemplary operating environment applicable to various embodiments of the present invention. In particular, FIG. 1 shows a parallel-distributed processing system in which one embodiment of the present invention is implemented. In this embodiment, the parallel-distributed processing system 100 operates in an SMP computing environment. In an SMP computing environment, parallel applications can have several tasks (processes) that execute on the various processors on the same processing node. The parallel-distributed processing system 100 executes on a plurality of processing nodes 102 and 104 coupled to one another node via a plurality of network adapters 106 and 108. Each processing node 102 and 104 is an independent computer with its own operating system image 110 and 112, channel controller 114 and 116, memory 118 and 120, and processor(s) 122 and 124 on a system memory bus 126 and 128. A system input/output bus 130 and 132 couples I/O adapters 134 and 136 and communication adapter 106 and 108. Although only one processor 122 and 124 is shown in each processing node 102 and 104 for simplicity, each processing node 102 and 104 can have more than one processor. The communication adapters are linked together via a network switch 138.

Also, one or more of the nodes 102, 104 comprises mass storage interface 140. The mass storage interface 140 is used to connect mass storage devices 142 to the node 102. One specific type of data storage device is a computer readable medium such as a Compact Disc ("CD") drive, which may be used to store data to and read data from a CD 144 or DVD. Another type of data storage device is a hard disk configured to support, for example, JFS type file system operations. In some embodiments, the various processing nodes 102 and 104 are able to be part of a processing cluster. The present invention is not limited to an SMP environment. Other architectures are applicable as well, and further embodiments of the present invention can also operate within a single system.

Processor Core

Figure 2:
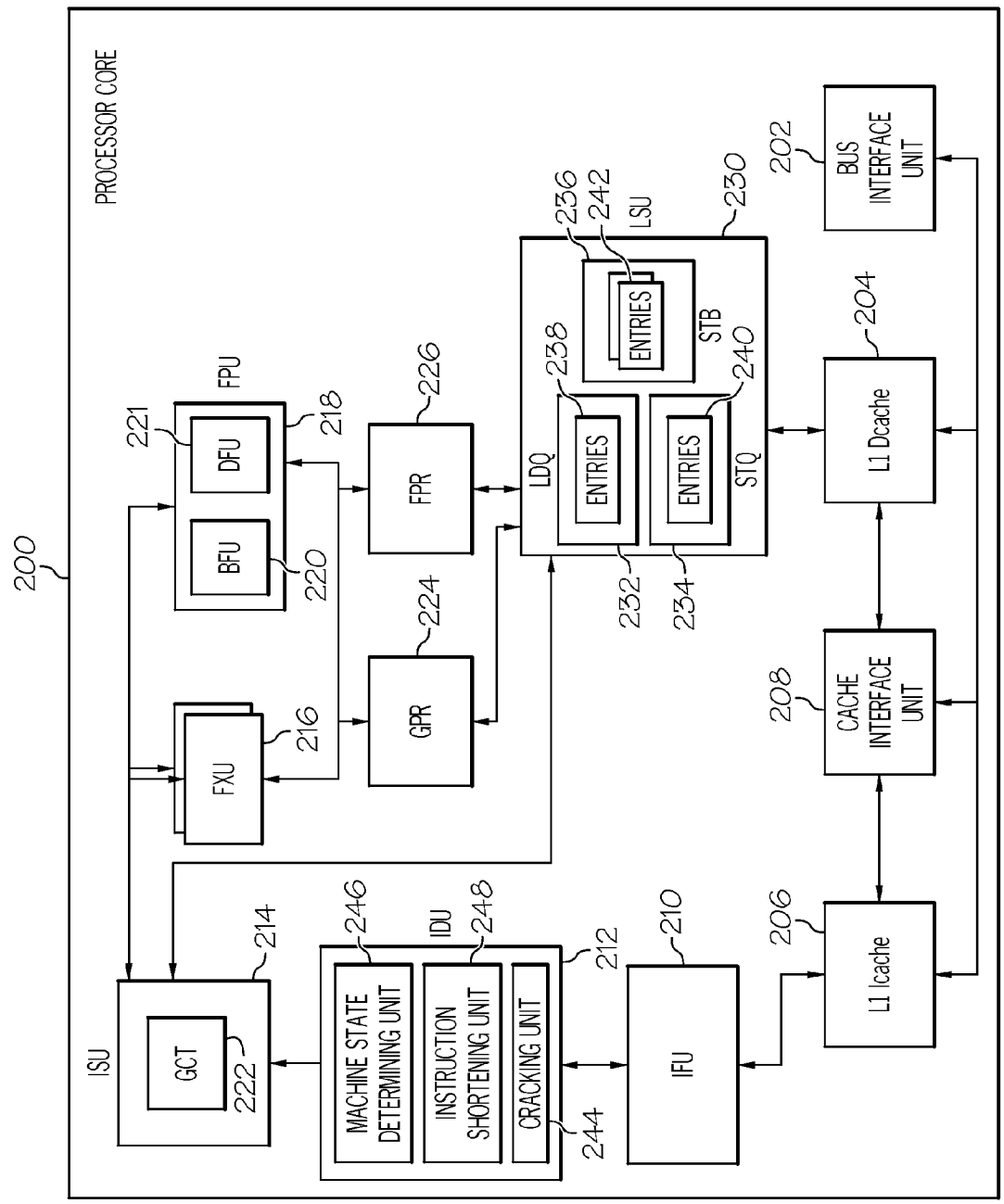
FIG. 2 illustrates a detailed view of a processing core according to one embodiment of the present invention.

According to one embodiment, FIG. 2 illustrates one example of a processor core 200 within a processor 122, 124 for cracking instructions based on machine state. It should be noted that the configuration shown in FIG. 2 is only one example applicable to the presently claimed invention. In particular, FIG. 2 shows a processing core 200. The processor core 200, in one embodiment, comprises a bus interface unit 202 that couples the processor core 200 to other processors and peripherals. The bus interface unit 202 also connects L1 Dcache 204, which reads and stores data values, L1 Icache 206, which reads program instructions, and a cache interface unit 208 to external memory, processor, and other devices.

The L1 Icache 206 provides loading of instruction streams in conjunction with an instruction fetch unit IFU 210, which prefetches instructions and may include speculative loading and branch prediction capabilities. These fetched instruction codes are decoded by an instruction decode unit IDU 212 into instruction processing data. Once decoded, the instructions are dispatched to an instruction sequencer unit (ISU) 214. The ISU 214 controls sequencing of instructions issued to various execution units such as one or more fixed point units (FXU) 216 for executing general operations and one or more floating point units (FPU) 218 for executing floating point operations. The floating point unit(s) 218 can be a binary point floating unit 220, a decimal point floating unit 221, and/or the like. It should be noted that the FXU(s) 216, in one embodiment, comprises multiple FXU pipelines, which are copies of each other. The ISU 214 is also coupled to one or more load/store units (LSU) 230 via one or more LSU pipelines. These one or more LSU pipelines are treated as execution units for performing loads and stores and address generation for branches.

A set of global completion tables (GCT) 222 residing within the ISU 214 tracks the instructions issued by ISU 214 via tags until the particular execution unit targeted by the instruction indicates the instructions have completed execution. The FXU 216 and FPU 218 are coupled to various resources such as general-purpose registers (GPR) 224 and floating point registers (FPR) 226. The GPR 224 and FPR 226 provide data value storage for data values loaded and stored from the L1 Dcache 204 by a load store unit (LSU) 230.

In addition, to the configuration of the processor core 200 discussed above, in one embodiment, the LSU 230 comprises a load queue (LDQ) 232, a store queue (STQ) 234, and a store buffer (STB) 236. The LDQ 232 and the STQ 234 each comprise entries 238, 240, respectively, that track additional information associated with outstanding load and store instructions. For example, the entries 238 of the LDQ 232 comprise the starting address and ending address of a corresponding load instruction. The entries 240 of the STQ 234 comprise the starting address and the ending address of corresponding store data. The STB 236 comprises entries 242 where a corresponding store instruction saves its data prior to writing the data back the cache 204.

In one embodiment, the IDU 212 comprises a cracking unit 244. The cracking unit 244 organizes/breaks a complex instruction into simpler units. Stated differently, the cracking unit 244 organizes an instruction into a set of units of operation (Uops) that can be handled in execution units. The cracking unit 244 is discussed in greater detail below. In one embodiment, the IDU 212 also comprises a machine status determining unit 246 that determines the current state of the machine state control bits such as, but not limited to, Program Status Word (PSW) bits, millimode state, slowmode state, emulation active state, and the like. In one embodiment, the machine state can also be determined from the instruction text of the instruction itself. For example, if the R2 field is zero; if the I2 field is a particular constant value; if the mask field is contiguous or zero; or the like the instruction can be cracked into different sets of Uops.

The machine status determining unit 246 is discussed in greater detail below. The IDU 212, in this embodiment, also comprises an instruction shortening unit 248 that alters the execution of the instruction by, for example, reducing execution steps and/or execution pipes. The shortened instruction occupies less issue queue resources and improves the issue queue bandwidth, occupies less GCT resources in some instances, hastens completion, reduces power consumption, results in fewer LDQ/STQ resource allocations, etc. The instruction shortening unit 248 is discussed in greater detail below.

Managing Instructions Based on Machine State

As discussed above, a computer system typically comprises an instruction fetch part/unit, instruction decode unit instruction grouping and dispatching unit, instruction sequencing and issuing unit, execution units (Fixed Point, Load Store, BFU, DFU, etc.) and instruction complete unit. Instruction decode refers to instructions being first decoded and understood. Information about the instruction's grouping, cracking, instruction characteristics such as load, store, and the like are decoded. At instruction dispatch (last in order point), information such as logical register number and type (GPR, FPR, AR, etc.), Condition Code read/write, FPC read/write, PSW read/write, and the like is provided to the ISU 214.

The ISU 214 maps the logical to physical register copies, sets dependency vectors, and stores the dispatched instruction in an instruction queue. Instructions ready for issue are read from the instruction queue, ranked per execution unit and age, and then issued to execution units. For example, if two instructions are ready to issue to an FXU pipe0, only the oldest instruction is issued since each execution unit can only receive a single instruction.

Therefore, in addition to the general processing mechanisms discussed above with respect to FIG. 1, various embodiments of the present invention increase IPC (Instructions per cycle) by optimizing the rate of instruction processing and increasing the throughput of data. For example, issue queues are sensitive for performance. Therefore, various embodiments of the present invention save issue queue entries by altering the processing of the decoded instructions for a fixed size queue that meets cycle time requirements. This improves the overall performance of the issue queue.

In one embodiment, during the instruction decode time, machine state control bits including Program Status Word (PSW) bits are used during instruction processing/decoding time to alter the instruction execution by changing instruction cracking and/or applying instruction shortening. The instruction alteration improves performance and ensures correct instruction execution.

When the IFU 210 fetches an instruction from the I-cache 206 the IFU 210 sends the instruction into the pipeline for decoding by the IDU 212. The IDU 212 decodes the instruction and identifies the instruction type such as, but not limited to, an RR-type branch instruction (e.g., BCTR, BCTGR, BCR, and BASR, and BALR); LA, LAY, LAE, and LAEY type instructions; shift/rotate type instructions (e.g., RLL and RLLG); and LCTL and SPKA instructions. The machine status determining unit 246 then determines the machine state based on machine state control bits including Program Status Word (PSW) bits.

Some of the PSW bits are address mode bits (PSW(31:32)), address space bit (PSW(16:17)), problem state bit (PSW (15)). With respect to the problem state bit, if this bit is zero, the processor is in "supervisor state" when all instructions are allowed. When this bit is one, some extra execution processing is required to determine if the execution is allowed, i.e., no exception is detected. With respect to the address space bits, these bits control the translation mode. In one of the modes (AR-mode), contents of Access Register specified by the base register number is needed for translation. With respect to the address mode bits, these bits affect the size of effective addresses and effective address generation. A value of "00" indicates an address size of 24-bits; a value of "01" indicates an address size of 31-bits; and a value of "11" indicates an address size of 64-bits. The size of address generation and usage is often referred to as the "addressing mode".

Other processor states that alter the instruction processing include millimode state, slowmode state, emulation active state, etc. Millimode state when set indicates that the processor is executing code that is not visible to programmers other than program mode. Millimode code is used to execute complicated instructions, handle program exceptions, asynchronous exceptions, etc. Slowmode bit is set when the processor is executing a single instruction (from instruction fetch till completion) used primarily to report precise exceptions, and to assume forward progress in a multiprocessing system.

Based on these identified values, the IDU 214 alters the processing of the decoded instructions. In one embodiment, the processing of the decoded instruction can be altered by cracking the instruction based on the identified machine state; the instruction can be shortened based on the identified machine state; and/or the instruction can be forced to millicode based on the identified machine state, as is discussed in greater detail below.

The following examples illustrate how the processing a decoded instruction is altered by cracking, shortening, and/or forcing the instruction to execute in millicode based on the identified machine state. It should be noted that the instruction sets used in the following examples are non-limiting, as various embodiments of the present invention are applicable to other instruction sets as well.

As discussed above, various instructions are sensitive to the machine state, which in one embodiment, is given by address mode bits. Current microprocessors including the z-microprocessors run applications on a different address mode when the memory address can be specified as a variable size. In z-processors, the size of the address can be 24 bits, 31 bits, and 64 bits depending on the addressing mode. Addressing mode bits are bits 31:32 of the PSW. The address generation (AGEN) is formed by adding the base register to the index register to the displacement field of an instruction. GPRs are specified as 64-bit register number where the high word (bit 0:31) and low word 32-bits (bits 32:63) are controlled independently. For example, the high word and the low word of a GPR are mapped and renamed differently and can point to two different physical registers. In other words, the 16 architected GPRs can be thought of as two sets of GPRs where one set includes the high part of the GPR's and the other set includes the low part of the GPRs.

In 64-bits addressing mode, the high and low words of the base and index registers are sources to the AGEN calculation. Address mode bits are predicted in the instruction fetch unit in microprocessors such as z-processors. Instructions delivered to the instruction decode unit are presented along with predicted addressing mode bits (addressing used to fetch instructions from the instruction cache) and a millicode bit identifying if the instruction is fetched from the millicode instruction space. In addition to the base and index registers used in AGEN calculations, the access register specified by the base register number (AR-base) is needed for cache operand address translations when the operand access is done in access resister mode (AR-mode). AR-mode is specified by PSW bits 16:17 (Address space), bit 5 (DAT bit) and other millicode control register bits.

One set of instructions that are sensitive to address mode bits are saving and linking branches such as BASR, BAS, BAL, and BALR instructions. These instructions branch to a new instruction address specified by the second operand (GPR-R2 for BALR/BASR and GPR-B2+D2 for BAL/BAS). In addition, information from the Program Status Word (PSW) including the updated instruction address is saved as link information in the first-operand location. PSW information that is saved includes the addressing mode bits specified by PSW bits 31 and 32.

In one embodiment, the machine status determining unit 246 determines that the current machine state is either in a 24 or 31 bit address mode as indicated by the address mode bits in the PSW. In this embodiment, the cracking unit cracks the instruction into a given number of Uops, such as 3 Uops as shown in FIG. 3. The first Uop1 302 calculates the branch target address. The second Uop2 304 determines calculates the address of the next instruction to be executed (instruction address IA+instruction length code) and stores the result in a scratch GPR. The third Uop3 306 stores the linking information in a GPR, which indicates the state of the machine prior to the cracking. In this embodiment, the linking information is found in bit 32 of the PSW.

If machine status determining unit 246 determines that the current machine state is a 64 bit address mode the shortening unit 248 shortens the cracking of the instruction to 2 Uops as compared to 3 Uops, as shown in FIGS. 3 and 4. In this embodiment, the cracking unit cracks the instruction into a given number of Uops, such as 2 Uops as shown in FIG. 4. The first Uop1 calculates the branch target address. The second Uop2 calculates the address of the next instruction to be executed (instruction address IA+ILC (instruction length code)) and stores the result in a scratch GPR. As can be seen, the instructions are cracked differently depending on the addressing mode of the processor.

In another embodiment, as shown in FIGS. 5 and 6 for BAL/BALR in 24-bit and 31-bit modes, respectively, the machine status determining unit 246 determines that the current machine state is either in a 24 or 31 bit address mode as indicated by the address mode bits in the PSW. In this embodiment, the cracking unit cracks the instruction into a given number of Uops, such as 3 Uops as shown in FIGS. 5 and 6. The first Uop1 calculates the branch target address. The second Uop2 calculates the address of the next instruction to be executed (instruction address IA+ILC (instruction length code)) and stores the result in a scratch GPR. The third Uop3 stores the linking information, such as condition code, instruction length code, and program mask (PSW(20:23)) in FIG. 5 for BAL/BALR in 24-bit mode and link information found in PSW bit 31 in FIG. 6 for BAL/BALR in 31-bit mode in a GPR, which indicates the state of the machine prior to the cracking.

The next example is with respect to forcing an instruction to execute in millicode. Millicode is not visible to external applications or compilers, but is used by Licensed Internal Code. Instructions are forced to execute in millicode if they are too complex to execute by hardware. Millicode can be thought of as a vertical microcode where for every instruction executed in millicode, the processor fetches a unique set of instructions (published one millicode special assist instructions) from millicode space (Storage System Area) and executes them. Forcing an instruction to millicode requires a sequence of Uops often known as milli-entry sequence. At decode time of the instruction, the instruction is evaluated if it is "complex", and if it is, a sequence of milli-entry Uops are dispatched instead of the normal dispatch sequence of the instruction. The following are some of the conditions examined by the machine status determining unit 246 that triggers hardware to force a given instruction to millicode.

One condition that the machine status determining unit 246 detects is if an instruction is under emulation mode (code running in Guest1 or Guest2 and not as a host) and SIE (Start Interpretive Execution) intercept is possible or the instruction is loading CR-E in emulation mode, such as for load and control (LCTL/LCTLG) instructions. In LCTL/LCTLG instructions control registers range from CR-R1 to CR-R3 and are loaded from memory specified by the second operand location. The Second operand address is equal to the contents of GPR-B2 added to the displacement field specified in the instruction text (D2 field).

The SIE interception may be triggered by instructions that cannot run in emulation mode and interception takes the control back to host. The machine status determining unit 246, in this embodiment, analyzes control registers to identify one or more control bits that indicate whether the instructions are under an emulation mode. If so, then the instruction is forced to execute in millicode.

Another condition that the machine status determining unit 246 detects is if an instruction, such as an SPKA (Set Program PSW Key) instruction, is in a problem state. In this embodiment, the machine status determining unit 246 analyzes the PSW and determines if bit 15 is set to 1 or not, where a 1 indicates a problem state. If this condition is true then the instruction is forced to execute in millicode.

In another example, a state of the machine is indicated by design states represented by setting internal latch(es) or a dynamically programmed set of latches or registers. In this example, the machine status determining unit 246 determines if a disable (scan only latch) latch(es) or dynamically programmed latches are set or equal to a certain value. If so then the instruction is forced to execute in millicode. Scan only latches are initialized at the power up of the system by scanning the engineering data into the design. In other words, these latches are always initialized to a predetermined value at the power on. In contrast, dynamically programmed latches or registers can be set to a predetermined value while the system is running.

Another condition is with respect to instruction overlap, which can be determined based on the instruction text of the instructions. In this example, a serialize opcode mechanism is provided by the machine status determining unit 246 determining if at decode time, the opcode of the decoded instruction matches a saved opcode. For example, if an instruction such as, but not limited to, an MVC instruction is first dispatched normally and at AGEN (operand address generation) time, the machine status determining unit 246 determines that instruction operands overlap destructively. Then, the MVC instruction is flushed and an action is taken to force the instruction to millicode. The instruction is then fetched from the Icache and given to decode logic. The decode logic then determines that this time the instruction is to be forced to millicode so that the move is performed in a slower fashion one byte at a time.

A further condition is directed to branching instructions such as BALR, BSM, BASSM, and BASR instructions. In this example, the machine status determining unit 246 determines if branch tracing is enabled. In branch tracing mode information about the branch instruction such as the branch target address is stored in memory area for reasons such as software debugging purposes. For example, the machine status determining unit 246 examines in a control register such as control register 12 and determines whether or not branch tracing is enabled. If so, the instruction is forced to execute in millicode.

Another condition is directed to set address mode instructions such as SAM24, SAM31, and SAM64 instructions. In this example, the machine status determining unit 246 determines if mode tracing is enabled. In mode tracing mode information about the instruction updating the addressing mode is stored in memory for reasons such as software debugging purpose. For example, the machine status determining unit 246 examines in a control register such as control register 12 and determines whether or not mode tracing is enabled. If so, the instruction is forced to execute in millicode.

The machine status determining unit 246, in another example, also determines if the monitor class selected is enabled for instructions such as, but not limited to, a Monitor Call (MC) instruction. In this example, the machine status determining unit 246 compares instruction text 12:15 with control register 8 bits 48:62. If the machine status determining unit 246 determines that any of the monitor class selected is enabled then the instruction is forced to execute in millicode so that the monitoring of facilities and programs occur.

When an instruction is forced to millicode based on the conditions discussed above, the cracking unit 244 cracks the instruction into a set of Uops. In one example, the milli-entry sequence comprises up to 9 Uops. A first Uop, Uop1: MGR9←$1^{st}$ operand address, calculates the address of the first operand and stores this address into a millicode GR, such as MGR9. The first operand address is calculated based on the instruction format. For example, for an RX-format the first operand address is equal to the Base GPR value+Index GPR+ displacement value.

A second Uop, Uop2: MAR9←AR-Base, saves the access register number needed for translation. Millicode AR-register 9 is set from program access register (AR-reg) used for translation in Access Register (AR) mode. In an RX/RS/SS format, AR-base register is the AR used for translation. A third Uop, Uop3, copies bits from the PSW such as access key, address mode, address space, etc and stores these bits in an internal millicode control register named Operand Access Control Register. Operand Access Control Register is used instead of the program PSW for operand accesses and AGEN calculation.

A fourth Uop, Uop4: MGR11←$2^{nd}$ operand address, is similar to the first Uop with the exception that the second operand address is being calculated. As with Uop1, the second operand address is calculated based on the instruction formation. For example, for an SS-format instruction the second operand address is equal to Base2 GPR value+displacement2 value. This Uop is for instructions comprising 2 memory operands. A fifth Uop, Uop5: MAR11←AR-Base2, is similar to Uop2, but directed to the second operand as compared to the first operand. A sixth Uop, Uop6: Another Millicode Control Register is updated based on instruction format and its instruction test bits. This Uop facilitates the execution of the instruction in millicode.

A seventh Uop, Uop7: MGR5←$1^{st}$ operand length for some instruction types, stores the operand length of the first operation. An eighth Uop, Uop8: MGR7←$2^{nd}$ operand length for some instruction types, stores the operand length of the second operand. A ninth Uop: Uop9, is a branch Uop since entering millicode is similar to a branch to a subroutine, which can be predicted by branch prediction logic.

In another example, the machine status determining unit 246 analyzes the size of the GPR (low word vs. the whole double word) target as a function of addressing mode bits.

The GPR target size (low word vs. the whole double word) for Load Address-type instructions (e.g. LA, LAY, LAE, LAEY, and LARL) is also a function of the addressing mode bits. With respect to Load Address-type instructions the effective address specified by B2, X2 and D2 is placed in general purpose register R1. The effective address (GPR-B2+GPR-X2+D2) size is 24 bits in 24-bit mode, 31 bits in 31-bit addressing mode and 64-bits in 64-bit addressing mode. The addressing mode is identified in the PSW. In 24-bit and 31-bit addressing modes, only the low word (low 32 bits) of the GPR-R1 is updated and high word remains unchanged. In 64 bits, the address updates the whole 64-bit GPR-R1.

As discussed above, in 24 and 31 bit address mode only the lower 32 bits of the GPR-R1 (bits 32:63) are updated with new value whereas bits 0:31 of the GPR remains unchanged. In 64-bit address mode bits 0:63 of GPR-R1 are updated. In a processor with different addressing modes, the low word of GPRs (bits 32:63) is mapped to a physical register independently from the high word of the GPR (bits 0:31). As a result, during the instruction decode cycles, the addressing mode is examined and if in 24 or 31 bit address mode, only the low word of GPR-R1 is identified as the instruction target, and consequently only the low-word of GPR-R1 is mapped to a physical register. Defining the right size of the GPR source/target also has power benefits since half of the mapper will not be clocked if only the low word of the GPRs is specified as a target.

In a further example, the machine status determining unit 246 analyzes the size of the GPR read (32-bit read vs. 64-bit read) as a function of the address mode. Address generation (AGEN) calculation used for cache access (Loads, Stores), branch targets and load address instructions are dependent on the address mode. Operand addresses and branch targets are defined as 24-bits in 24-bit address mode, 31 bit in 31-bit address mode and 64-bit in 64-bit address modes. Therefore, at instruction decode time, the address mode is examined and determined to be in 24 or 31-bit mode, then the high word (bits 0:31) of base and index registers are not identified as a source for the AGEN calculation. This results in power saving for mapper look up for high word of base/index registers and removes any GPR interlock over detection if an older instruction is updating base or index register bits 0:31.

The machine status determining unit 246, in another example, analyzes the Access Register (AR-reg) source as a function of address space (PSW(16:17)) and PSW(5). Data cache access address is subject to translation from logical address to absolute address. One mode of translation used for operand accesses is Access Register Mode (AR-mode) translation. In this mode, the AR-reg contents are used for translation. For an RX-load/store with base and index registers, the content of AR-base is needed for translation if the fetch/store is done in AR-mode. AR-mode is defined as PSW(16:17)="01" and either DAT bit (PSW(5)) or other control state is active. Therefore, at instruction decode time, the machine status determining unit 246 checks whether the cache access will be in AR-mode and set AR-base as source accordingly. Therefore if cache access is not in AR-mode then AR-base is not identified as a source for the AGEN and power is saved by not looking up its mapped physical register number and also instruction dependency over detection is removed in case an older instruction is updating AR-base.

As can be seen from the above discussion, various embodiments of the present invention alter the processing of the decoded instructions. In one embodiment, the processing of the decoded instruction can be altered by cracking the instruction based on the identified machine state; the instruction can be shortened based on the identified machine state; and/or the instruction can be forced to millicode based on the identified machine state. The machine state can be determined from PSW bits such as address mode bits (PSW(31:32)), address space bit (PSW(16:17)), problem state bit (PSW(15)). Other processor state bits that alter the instruction processing include millimode bit, slowmode bit, emulation active bit, etc. Also, the actual instruction text itself is considered the "machine state" and is used to alter the processing of the decoded instructions.

Operational Flow Diagram

Figure 7:
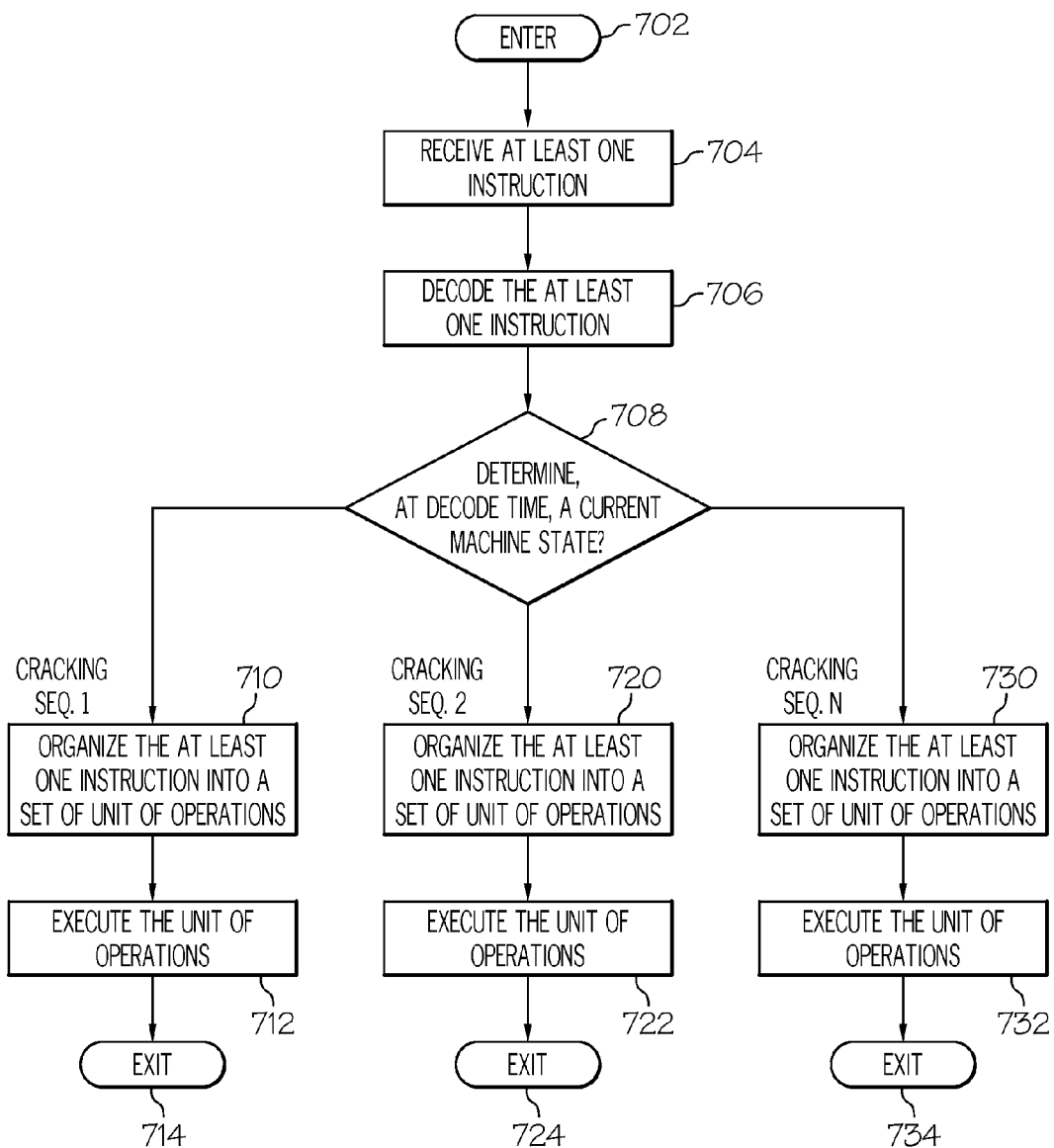
FIG. 7 is an operational flow diagram illustrating one example of cracking an instruction based on machine state according to one or more embodiments of the present invention.

FIG. 7 is an operational flow diagram illustrating one example of cracking instructions based on machine state. The operational flow diagram of FIG. 7 beings at step 702 and flows directly into step 704. The IDU 214, at step 3104, receives an instruction. The IDU 214, at step 706, decodes the instruction. The IDU 214, via the machine state determining unit 24 at step 708, determines the current machine state as discussed above with respect to FIGS. 2-6. Depending on the results of steps 708, a cracking sequence is selected from n cracking sequences as shown. For cracking sequence 1, the IDU 214, via the cracking unit 244 at step 710, organizes the at least one instruction into a set of unit of operations. The set of unit of operations, at step 712, are then executed. The control flow then exits at step 714 Likewise for cracking sequence 2, the IDU 214, via the cracking unit 244 at step 720, organizes the at least one instruction into a set of unit of operations. The set of unit of operations, at step 722, are then executed. The control flow then exits at step 724. And for cracking sequence N, the IDU 214, via the cracking unit 244 at step 730, organizes the at least one instruction into a set of unit of operations. The set of unit of operations, at step 732, are then executed. The control flow then exits at step 734.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

Although various example embodiments of the present invention have been discussed in the context of a fully functional computer system, those of ordinary skill in the art will appreciate that various embodiments are capable of being distributed as a program product via CD or DVD, e.g. CD, CD ROM, or other form of recordable media, or via any type of electronic transmission mechanism.

The invention claimed is:

1. A method for managing instruction execution based on a current machine state, the method comprising:
   receiving at least one macroinstruction;
   decoding, by an instruction decode unit of a processor core, the at least one macroinstruction;
   based on the decoding, determining, a current machine state by the instruction decode unit;
   based on the current machine state that has been determined, directly cracking, by the instruction decode unit, the at least one macroinstruction directly into a set of unit of operations for a fixed size queue, each of the set of unit of operations being executable by at least one execution unit, the cracking reducing at least one of execution steps performed by an execution unit and execution pipes, wherein the instruction decode unit directly cracks the at least one macroinstruction for a plurality of unit of operation lengths, wherein the plurality of unit of operation lengths comprises at least a length of two unit of operations and a length of three unit of operations; and executing the at least one macroinstruction, wherein the executing comprises executing the set of unit of operations by one or more execution units.

2. The method of claim 1, wherein the determining further comprises:

analyzing at least one of a set of machine state control bits and an instruction text associated with the at least one macroinstruction.

3. The method of claim 2, wherein the set of machine state control bits comprise at least one of:

a slowmode state; and an emulation active state.

4. The method of claim 3, wherein the set of machine state control bits comprise a set of Program Status Word bits comprising:

a set of address mode bits;

an address state bit; and a problem state bit.

5. The method of claim 1, wherein the cracking is based on the current machine state being associated with one of at least a first address mode and a second address mode, and wherein the cracking further comprises:

based on the current machine state being associated with the first address mode, directly cracking the at least one macroinstruction into a first plurality of unit of operations; and based on the current machine state being associated with the second address mode, directly cracking the at least one macroinstruction into a second plurality of unit of operations if the current machine state is associated with the second address mode, wherein the second plurality of unit of operations comprises at least one less unit of operation than the first plurality of unit of operations.

6. The method of claim 1, further comprising:

determining, based on the current machine state that has been determined, that the at least one macroinstruction is to be executed in millicode.

7. The method of claim 6, wherein the current machine state has been determined to be in at least one of:

an emulation mode;

a problem state:

a disable latch mode;

a dynamically programmed latch mode;

a serialized opcode mode;

a branch tracing mode;

a mode tracing mode; and a monitor class selected mode.

8. The method of claim 6, wherein the cracking is based on determining that the at least one macroinstruction is to be executed in millicode, and wherein the set of unit of operations comprises at least one of:

a first unit of operation that determines an address of a first operand;

a second unit of operation that sets a millicode access register based on a program access register used for translating the address of the first operand in access register mode;

a third unit of operation that sets at least one millicode control register based on a current Program Status Word value;

a fourth unit of operation that determines an address of a second operand;

a fifth unit of operation that sets a millicode access register based on a program access register used for translating the address of the second operand in access register mode;

a sixth unit of operation that copies at least a portion of an instruction text of the at least one macroinstruction to a millicode control register;

a seventh unit of operation that stores a length of the second operand into a millicode general register;

an eighth unit of operation that stores a length of the second operand into a millicode general register; and a ninth unit of operation that is a branch unit of operation.

9. The method of claim 1, wherein the determining further comprises:

determining a size of a general purpose register associated with the at least one macroinstruction as a function of a set of addressing mode bits.

10. The method of claim 1, wherein the determining further comprises:

determining a general purpose register read type associated with the at least one macroinstruction as a function of a set of addressing mode bits.

11. The method of claim 1, wherein the determining further comprises:

determining an address register source associated with the at least one macroinstruction as a function of an address space and a multiple control data space mode.

12. An information processing system for managing instruction execution based on a current machine state, the information system comprising:

a processor;

a memory communicatively coupled to the processor; and an instruction decoding unit comprising an instruction cracking unit, wherein the instruction decoding unit is configured to perform a method comprising receiving at least one macroinstruction; and decoding the at least one macroinstruction;

a current machine state determining unit configured to perform a method comprising based on the decoding, determining, a current machine state by the instruction decode unit, wherein the instruction cracking unit is configured to perform a method comprising based on the current machine state that has been determined, directly cracking the at least one macroinstruction directly into a set of unit of operations for a fixed size queue, each of the set of unit of operations being executable by at least one execution unit, wherein the instruction cracking unit directly cracks the at least one macroinstruction for a plurality of unit of operation lengths, wherein the plurality of unit of operation lengths comprises at least a length of two unit of operations and a length of three unit of operations, the cracking reducing at least one of execution steps performed by an execution unit and execution pipes, wherein the direct cracking comprises determining, by the instruction decode unit, an instruction type associated with the at least one macroinstruction;

based on the instruction type and the current machine state, selecting, by the instruction decode unit, a cracking sequence from a plurality of cracking sequences associated with the instruction type, wherein a different cracking sequence is selected from the plurality of cracking sequences for macroinstructions of the same instruction type based on the current machine state; and performing, by the instruction decode unit, the cracking sequence directly on the at least one macroinstruction, the cracking sequence organizing the at least macroinstruction into the set of unit of operations, wherein each of the set of unit of operations is an executable form, wherein the processor is configured to execute the at least one macroinstruction, wherein executing the at least one macroinstruction comprises executing the set of unit of operations by one or more execution units of the processor.

13. The information processing system of claim 8, wherein determining the current machine state further comprises:

analyzing at least one of a set of machine state control bits and an instruction text associated with the at least one macroinstruction.

14. The information processing system of claim 12, wherein the at least one macroinstruction is directly cracked into a set of unit of operations based on the current machine state being associated with one of at least a first address mode and a second address mode, and wherein performing the cracking sequence further comprises:

based on the current machine state being associated with the first address mode, cracking the at least one macroinstruction into a first plurality of unit of operations; and based on the current machine state being associated with the second address mode, cracking the at least one macroinstruction into a second plurality of unit of operations if, wherein the second plurality of unit of operations comprises at least one less unit of operation than the first plurality of unit of operations.

15. The information processing system of claim 12, wherein the at least one macroinstruction is cracked based on determining that the at least one macroinstruction is to be executed in millicode, and wherein the set of unit of operations comprises at least one of:

a first unit of operation that determines an address of a first operand;

a second unit of operation that sets a millicode access register based on a program access register used for translating the address of the first operand in access register mode;

a third unit of operation that sets at least one millicode control register based on a current Program Status Word value;

a fourth unit of operation that determines an address of a second operand;

a fifth unit of operation that sets a millicode access register based on a program access register used for translating the address of the second operand in access register mode;

a sixth unit of operation that copies at least a portion of an instruction text of the at least one macroinstruction to a millicode control register;

a seventh unit of operation that stores a length of the second operand into a millicode general register;

an eighth unit of operation that stores a length of the second operand into a millicode general register; and a ninth unit of operation that is a branch unit of operation.

16. A computer program product for managing instruction execution based on a current machine state, the computer program product comprising:

a non-transitory storage medium readable by a processing circuit and storing instructions for execution by the processing circuit for performing a method comprising:

receiving at least one macroinstruction;

decoding, by an instruction decode unit of a processor core, the at least one macroinstruction;

based on the decoding, determining that a current machine state is in one of a plurality of address modes;

based on the current machine state that has been determined, directly cracking, by the instruction decode unit, the at least one macroinstruction directly into a set of unit of operations for a fixed size queue to meet a given cycle time requirement by reducing at least one of execution steps performed by an execution unit and execution pipes, each of the set of unit of operations being executable by at least one execution unit, wherein the instruction decode unit directly cracks the at least one macroinstruction for a plurality of unit of operation lengths, wherein the plurality of unit of operation lengths comprises at least a length of two unit of operations and a length of three unit of operations; and executing the at least one macroinstruction, wherein the executing comprises executing the set of unit of operations by one or more execution units.

17. The computer program product of claim 16, wherein the determining further comprises:

analyzing at least one of a set of machine state control bits and an instruction text associated with the at least one macroinstruction.

18. The computer program product of claim 17, wherein the set of machine state control bits comprise a set of Program Status Word bits comprising at least one of:

a set of address mode bits;

an address state bit; and a problem state bit.

19. The computer program product of claim 16, wherein the cracking is based on the current machine state being associated with one of at least a first address mode and a second address mode in the plurality of address modes, and wherein the organizing further comprises:

based on the current machine state being associated with the first address mode, directly cracking the at least one macroinstruction into a first plurality of unit of operations; and based on the current machine state being associated with the second address mode, directly cracking the at least one macroinstruction into a second plurality of unit of operations if, wherein the second plurality of unit of operations comprises at least one less unit of operation than the first plurality of unit of operations.

* * * * *